United States Patent
Wilfred

(10) Patent No.: US 9,067,300 B2
(45) Date of Patent: Jun. 30, 2015

(54) WORKPIECE CARRIER

(75) Inventor: Thom Wilfred, Bingen (DE)

(73) Assignee: OERLIKON SURFACE SOLUTIONS AG, TRÜBBACH, Truebbach (CH)

( * ) Notice: Subject to any disclaimer, the term of this patent is extended or adjusted under 35 U.S.C. 154(b) by 755 days.

(21) Appl. No.: 13/139,614

(22) PCT Filed: Dec. 15, 2009

(86) PCT No.: PCT/EP2009/008982
§ 371 (c)(1),
(2), (4) Date: Jun. 23, 2011

(87) PCT Pub. No.: WO2010/069550
PCT Pub. Date: Jun. 24, 2010

(65) Prior Publication Data
US 2011/0260386 A1    Oct. 27, 2011

Related U.S. Application Data

(60) Provisional application No. 61/122,773, filed on Dec. 16, 2008.

(51) Int. Cl.
| | | |
|---|---|---|
| B25B 1/00 | (2006.01) | |
| A47B 91/00 | (2006.01) | |
| B24B 41/06 | (2012.01) | |
| B23B 31/117 | (2006.01) | |

(52) U.S. Cl.
CPC .............. *B24B 41/067* (2013.01); *B24B 41/06* (2013.01); *B23B 31/1175* (2013.01)

(58) Field of Classification Search
CPC ...... B24B 41/00; B24B 41/067; B23B 31/00; B23B 31/1175

USPC ........ 269/86, 289 R, 309, 310; 118/500, 730; 248/349.1
See application file for complete search history.

(56) References Cited

U.S. PATENT DOCUMENTS

| | | | | |
|---|---|---|---|---|
| 5,244,325 A | * | 9/1993 | Knohl ............................ | 411/353 |
| 5,560,480 A | * | 10/1996 | Singleton ...................... | 206/373 |
| 5,753,863 A | * | 5/1998 | Grajewski et al. ............ | 174/151 |

FOREIGN PATENT DOCUMENTS

| | | |
|---|---|---|
| JP | 60-91351 | 6/1985 |
| JP | 06-033635 U | 5/1994 |
| JP | 08-121419 A | 5/1996 |
| JP | 09-300168 A | 11/1997 |

* cited by examiner

*Primary Examiner* — Lee D Wilson
*Assistant Examiner* — Seahee Yoon
(74) *Attorney, Agent, or Firm* — Notaro, Michalos & Zaccaria P.C.

(57) ABSTRACT

A workpiece carrier comprises a base with an upper part rotatable about a vertical axis and a lower part connected to the upper part at a distance by bolts. Workpiece holders each comprise a sleeve of elastically deformable material like rubber surrounding a duct where the shaft of a workpiece can be inserted, the sleeve being accommodated in a recess on the base. The vertical position of the sleeve which extends through holes in the upper part and lower part of the base, respectively, is fixed by a stop formed between a recessed rim surrounding the hole in the lower part and a downward-facing projecting rim of the sleeve. The shaft can be fixed by swivelling a lever about one of the bolts into an active position where a compressing surface of the same compresses the sleeve such that the shaft is jammed and released by swivelling the lever back into an inactive position where the compressing surface is not in contact with the sleeve.

20 Claims, 1 Drawing Sheet

WORKPIECE CARRIER

FIELD OF THE INVENTION

The invention concerns a workpiece carrier as used in various processing installations where workpieces with a shaft like, for instance, milling tools, are processed, e.g., by slide grinding or other surface treatment methods.

PRIOR ART

Workpiece carriers of the generic type are known where each workpiece holder is in the shape of a sleeve consisting of a rigid material like steel which accommodates the shaft of the workpiece. To keep the latter reliably in place the sleeve must narrowly surround the shaft, i.e., the inside diameter of the sleeves must conform to the diameter of the shafts. Whenever the diameters of the workpiece shafts change the workpiece carrier must be exchanged which causes a lengthy interruption of the processing.

It is also known to use a threaded bolt engaging with a radial threaded bore in the sleeve which can fix a shaft whose diameter is smaller than the inside diameter of the sleeve by clamping it against the opposite wall of the latter. In this way an exchange of the workpiece carrier can be avoided in most cases. However, the releasing and fixing of workpieces is rather onerous and time-consuming.

SUMMARY OF THE INVENTION

It is the object of the invention to provide a workpiece carrier of the generic type which can accommodate workpieces with varying shaft diameters and nevertheless allows for fast and easy loading and unloading. This object is achieved by the features in the characterizing portion of claim 1.

The workpiece carrier according to the invention allows workpieces with shaft diameters varying over a rather wide range to be reliably retained with no adaptations being necessary. Even where the diameters of the shafts differ so widely that adaptations cannot be avoided they latter are simple and do not take much time. Fixing and releasing of the workpieces can be made very easy and quick, such that they require only a single hand movement per workpiece.

BRIEF DESCRIPTION OF THE DRAWINGS

In the following the invention is described in more detail with reference to drawings which show an embodiment.

DESCRIPTION OF THE PREFERRED EMBODIMENTS

Figure 1:
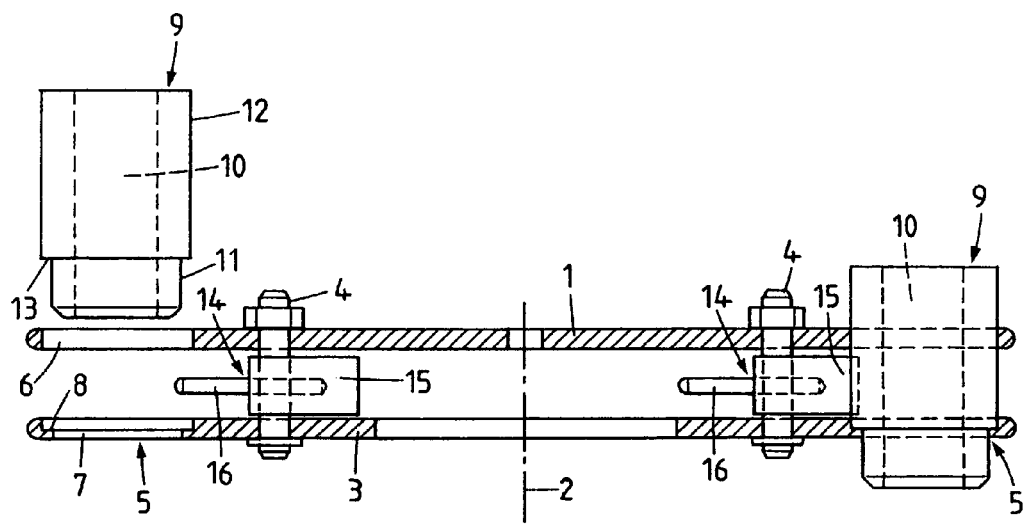
FIG. 1 shows a vertical section through a workpiece carrier according to the invention and FIG. 2 shows a horizontal section through the workpiece carrier of FIG. 1.

The workpiece carrier comprises a base which consists of a disk-shaped upper part 1 (not shown in FIG. 2) which is mounted so as to be rotatable about a vertical axis 2 and a ring-shaped lower part 3 which is arranged below the upper part 1 at a distance and connected to the same by a plurality of vertical bolts 4 each penetrating the upper part 1 and in the lower part 3. Along the circumference of the base workpiece holders are arranged, each with a recess 5 for taking up one of the workpieces. The recesses 5 are distributed uniformly about the circumference of the base at a fixed distance from the axis 2. Each recess 5 consists of a round hole 6 in the upper part 1 and a coaxial round hole 7 of slightly smaller diameter in the lower part 3. The hole 7 is surrounded by a rim 8 which is slightly recessed from the upper surface of the lower part 3. The outer diameter of the rim 8 is equal to the diameter of the hole 6 in the upper part 1.

Each of the recesses 5 accommodates a sleeve 9 which consists of elastic material, preferably rubber or some elastically deformable plastic. The sleeve surrounds a round duct 10 of constant cross section and comprises a lower portion 11 whose outside diameter is slightly smaller than the diameter of the hole 7 of the lower part 3 and an upper portion 12 whose outside diameter is larger than that of the lower portion 11, being slightly smaller than that of the hole 6 in the upper part 3 of the base, with its lower end forming a downward-facing annular projecting rim 13 abutting against a stop formed by the rim 8 which surrounds the hole 7. The sleeve 9 is accommodated in the recess 5, tightly surrounded by the edges of holes 6, 7, with little lateral play, and its vertical position fixed by the stop provided by rim 8. Its upper portion 12 protrudes somewhat above the upper part 1 and its lower portion 11 below the lower part 3 of the base.

Between each of the recesses 5 and the axis 2 one of the bolts 4 is provided which, apart from connecting the lower part 3 of the base to its upper part 1, also serves as a swivel axis for a lever 14 which at one end carries a cylindrical body whose circumference serves as smooth convex compressing surface 15. At its opposite end the lever 14 extends beyond the bolt 4, forming a handle 16 which can be gripped to rotate it about the bolt 4.

A workpiece can be carried by each one of the sleeves 9 with a shaft 17 of the workpiece inserted in the duct 10 and the part to be processed suspended below the base where it can extend into, e.g., a basin filled with an abrasive paste, the base rotating about the axis 2. The diameter of the shaft 17 must, of course, not be greater than the width of the duct 10 and is preferably smaller.

Figure 2:
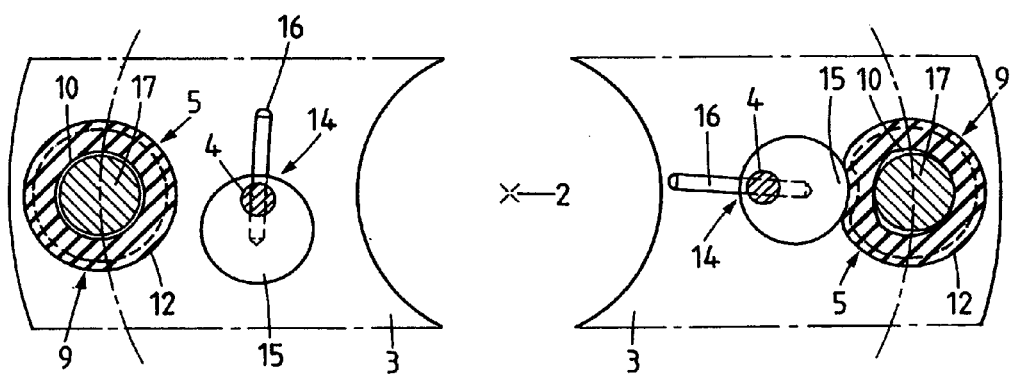

In an active position of the lever 14 (s. FIG. 2, right hand side) where it is oriented essentially radially the compressing surface 15 presses against the outside of the sleeve 9 between the upper part 1 and the lower part 3 of the base, thereby elastically squeezing the same in such a manner that it assumes a compressed gripping configuration where its cross section is deformed, with the duct 10 narrowed in the radial direction such that the shaft 17 of a workpiece accommodated in the sleeve 9 is jammed and thereby fixedly retained. A workpiece which has been fixed in this manner can be subjected to considerable loads without any risk of its position being substantially influenced. Even surface treatment methods like slide grinding, where the forces acting on the workpiece may be considerable, pose no problems in that respect. The shaft 17 is reliably fixed even where its diameter is notably smaller than the width of the duct 10 as the sleeve 9 can be deformed accordingly and adapts automatically to the size of the shaft.

For loading and unloading of workpieces the lever 14 (s. FIG. 2, left hand side) is rotated about the bolt 4 by about 90° such that its orientation is essentially azimutal. In this inactive position the compressing surface 15 is not in contact with the sleeve 9 which is therefore in a relaxed loading configuration where its cross section is essentially circular such that it does not jam the shaft. The workpiece can now easily be removed and a new workpiece loaded and fixed by swivelling the lever 14 back into its active position.

Due to the sleeve 9 being fixed both above and below the area where it is contacted by the compressing surface 15 considerable pressure can be exerted on the sleeve without a deformation beyond radial compression being caused by the impact of the compressing surface 15. This ensures that the orientation of the shaft 17 is not disturbed when the lever 14 assumes its active position. As the bolts 4 are anchored in both the upper part 1 and the lower part 3 of the base their connections with those parts are not subjected to large momenta even where considerable force is exerted on the sleeve 9 by the compressing surface 15.

The change from the active to the inactive position and back can each be effected by a single hand movement—grasping the handle 16 and pulling or pushing the same. The resistance offered by the sleeve 9 when the lever 14 is swivelled to its active position can be controlled by choosing, apart form the properties of the sleeve 9 itself, the length of the handle 16 and the shape of the compressing surface 15 and its distance from the swivel axis, i.e., the bolt 4.

As already stated, a considerable span of different shaft diameters can be tackled with a single type of sleeve. However, as the sleeves can be exchanged quite easily it is also possible to extend the range by using different sets of sleeves, each with the same outside dimensions but with ducts of different widths. Workpieces with shafts of different diameters can be mounted and processed on the workpiece carrier in parallel, with sleeves pertaining to one and the same type or to different types being used.

Many modifications of the described embodiment are possible within the scope of the invention. Whereas the sleeve can be circumferentially closed, i.e., essentially tube-shaped, it can also have axial or inclined slots which may extend over its whole length or over only part of the same such that compressing the sleeve requires less force. This may be convenient where the wall of the sleeve is rather thick. In stead of levers, other mechanical fixing means for retaining the sleeve in its gripping configuration can be employed, such as tensible wires or strips which surround the sleeve.

LIST OF REFERENCE SYMBOLS 1 upper part
2 axis
3 lower part
4 bolt
5 recess
6 hole
7 hole
8 rim
9 sleeve
10 duct
11 lower portion
12 upper portion
13 projecting rim
14 lever
15 compressing surface
16 handle
17 shaft

The invention claimed is:

1. Workpiece carrier with a base and a plurality of workpiece holders, each for receiving a shaft (17) of a workpiece, distributed over the base, characterized in that of at least part of the workpiece holders each comprises a sleeve (9) for surrounding the shaft, the sleeve (9) consisting of an elastically deformable material and arranged in a recess (5) of the base and being changeable between a loading configuration where the shaft (17) can be introduced into the sleeve (9) or removed from the sleeve, and a gripping configuration where the sleeve is elastically compressed such that the sleeve jams the shaft (17) surrounded by the sleeve;

wherein each sleeve (9) comprises a lower portion (11), and an upper portion (12) separated from the lower portion (11) by a projecting rim (13) abutting against a stop on the base;

wherein each recess (5) comprises a hole (7) in a lower part (3) through which the lower portion (11) of the sleeve (9) extends and a larger hole (6) in an upper part through which the upper portion (11) of the sleeve (9) extends, the sleeve being tightly surrounded by the edges of the said holes (6, 7); and wherein the hole (7) in the lower part is surrounded by a rim (8) forming the stop.

2. The workpiece carrier according to claim 1, characterized in that the workpiece carrier comprises, for each sleeve, mechanical fixing means switchable between an active position where the mechanical fixing means act on the sleeve so as to keep the sleeve in the elastically compressed gripping configuration of the sleeve, and an inactive position where the mechanical fixing means do not act on the sleeve leaving the sleeve in the loading configuration.

3. The workpiece carrier according to claim 1, characterized in that the base consists of an upper part (1) and a lower part (3) at a distance from the upper part (1).

4. The workpiece carrier according to claim 2, characterized in that the fixing means comprise in each case a lever (14) rotatable about a swivel axis fixed upon the base.

5. The workpiece carrier according to claim 3, characterized in that a lever (14) is mounted between the upper part (1) of the base and the lower part (3) of the base.

6. The workpiece carrier according to claim 5, characterized in that the workpiece carrier comprises, for each lever (14), a bolt (4) connecting the upper part (1) and the lower part of the base, about which the lever (14) is swivellable.

7. The workpiece carrier according to claim 4, characterized in that the lever (14) exhibits a smooth compressing surface (15) pressing against the sleeve (9) in the active position of the lever (14) and a handle (16) extending away from the same beyond the swivel axis.

8. The workpiece carrier according to claim 1, characterized in that the base is rotatably mounted to be rotatable about a vertical axis (2).

9. The workpiece carrier according to claim 3, characterized in that the upper part (1) and the lower part (3) of the base are each disk-shaped or ring-shaped and the recesses (5) are uniformly distributed about the circumference of the base at a fixed distance from an axis (2).

10. The workpiece carrier according to claim 1, characterized in that each sleeve (9) surrounds a duct (10) of axially constant circular cross section.

11. The workpiece carrier according to claim 1, characterized in that each sleeve (9) consists of rubber or elastically deformable plastic.

12. The workpiece carrier according to claim 3, characterized in that each recess (5) comprises a hole (7) in the lower part (3) through which a lower portion (11) of the sleeve (9) extends and a larger hole (6) in the upper part through which an upper portion (11) of the sleeve (9) extends, the upper portion of the sleeve being tightly surrounded by the edges of the said holes (6, 7).

13. The workpiece carrier according to claim 4, characterized in that the lever (14) is mounted between the upper part (1) and the lower part of the base.

14. The workpiece carrier according to claim 8, characterized in that an upper part (1) and a lower part (3) of the base are each disk-shaped or ring-shaped and the recesses (5) are uniformly distributed about the circumference of the base at a fixed distance from the axis (2).

15. Workpiece carrier with a base and a plurality of workpiece holders distributed over the base, each workpiece holder shaped for receiving a shaft (17) of a workpiece;
- wherein the workpiece holders each comprise a sleeve (9) for surrounding a shaft, the sleeve (9) consisting of an elastically deformable material and arranged in a recess (5) of the base;
- the sleeve being changeable between (I) a loading configuration where the shaft (17) can be introduced into the sleeve (9) or removed from the sleeve, and (II) a gripping configuration where at least part of the sleeve is elastically radially compressed such that the sleeve jams the shaft (17) surrounded by the sleeve by inward radial compression of the sleeve;
- wherein the workpiece carrier comprises, for each sleeve, mechanical fixing means switchable between: (II) an active position where the mechanical fixing means act on the sleeve so as to keep the sleeve in the gripping configuration by elastically radially compressing at least part of the sleeve, and (I) an inactive position where the mechanical fixing means do not act on the sleeve leaving the sleeve in the loading configuration; and
- wherein the fixing means comprise in each case a lever (14) rotatable about a swivel axis fixed upon the base.

16. The workpiece carrier according to claim 15, characterized in that each sleeve (9) comprises a lower portion (11), and an upper portion (12) separated from the lower portion (11) by a projecting rim (13) abutting against a stop on the base.

17. The workpiece carrier according to claim 15, characterized in that the base is rotatably mounted to be rotatable about a vertical axis (2).

18. The workpiece carrier according to claim 15, characterized in that each sleeve (9) surrounds a duct (10) of axially constant circular cross section.

19. The workpiece carrier according to claim 15, characterized in that the workpiece carrier comprises, for each lever (14), a bolt (4) connecting the upper part (1) and the lower part of the base, about which the lever (14) is swivellable.

20. Workpiece carrier with a base and a plurality of workpiece holders, each for receiving a shaft (17) of a workpiece, distributed over the base, characterized in that at least part of the workpiece holders each comprises a sleeve (9) for surrounding the shaft, the sleeve (9) consisting of an elastically deformable material and arranged in a recess (5) of the base and being changeable between a loading configuration where the shaft (17) can be introduced into the sleeve (9) or removed from the sleeve, and a gripping configuration where the sleeve is elastically compressed such that the sleeve jams the shaft (17) surrounded by the sleeve;
- wherein the base consists of an upper part (1) and a lower part (3) at a distance from the upper part (1); and
- wherein a lever (14) is mounted between the upper part (1) of the base and the lower part (3) of the base.

* * * * *